Oct. 8, 1929.　　　J. ALEXANDER　　　1,730,713
PLASTER AND MORTAR MIXER
Filed March 22, 1928
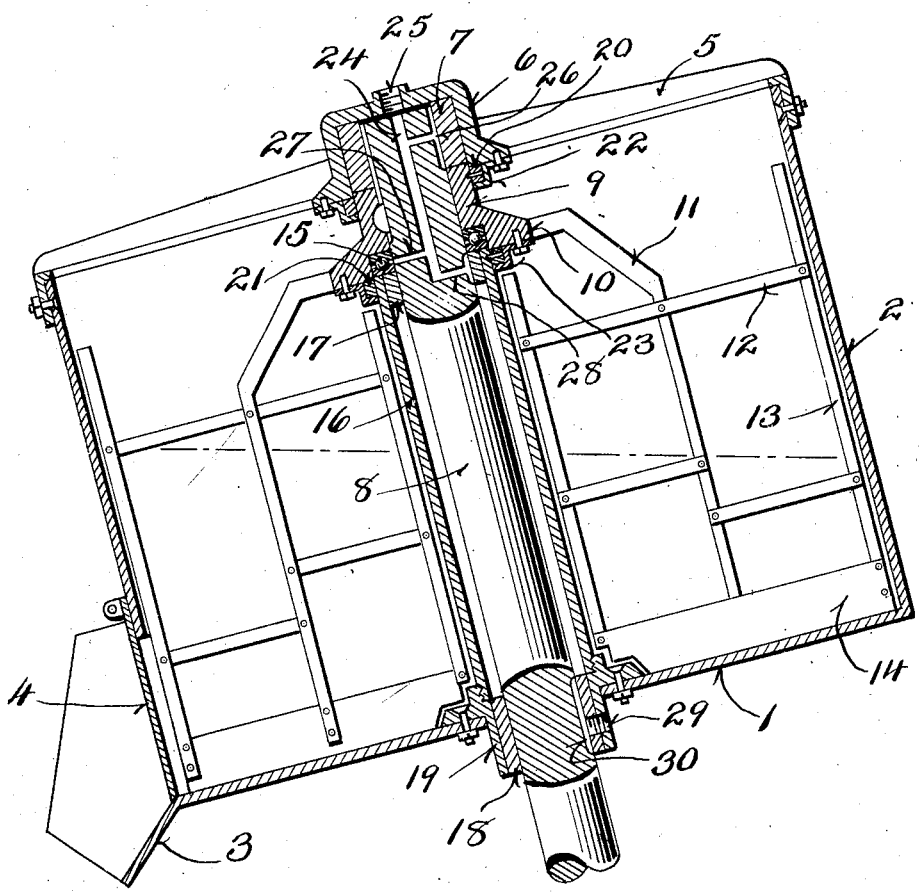
Witness
T. P. Britt
Inventor
J. Alexander
By
Attorneys Patented Oct. 8, 1929

1,730,713

UNITED STATES PATENT OFFICE

JOHN ALEXANDER, OF MILWAUKEE, WISCONSIN

PLASTER AND MORTAR MIXER

Application filed March 22, 1928. Serial No. 263,620.

This invention relates to a plaster and mortar mixer.

Objects of this invention are to provide a plaster and mortar mixer which is so constructed that it will thoroughly and quickly mix the plaster and mortar in a highly effective manner, and which is so made that it will scrape the particles of the plaster or mortar from the mixing vessel while it is being discharged.

Further objects are to provide a mixer which is so constructed that the bearings are sealed against dust, grit, or other injurious material, and which is so made that the mortar or plaster may be dumped freely into the device without paying any attention whatsoever to the bearings as they are thoroughly sealed.

Further objects are to provide a device which is very simple in construction and which may be easily produced.

An embodiment of the invention is shown in the accompanying drawings in which:

The single view is a sectional view through the device.

Referring to the drawing, it will be seen that the mixer consists of a stationary drum 1 having a bottom and cylindrical sides 2. This drum is tilted and is provided with a discharge spout 3 adjacent its lowest portion. It is provided with any suitable form of discharge flap 4 or gate.

The drum is provided with an upper spider 5 which carries a bearing support 6. Within this bearing support, a bearing or bushing 7 is positioned and receives the upper end of the shaft 8. Below the bearing 7 a revolubly mounted head 9 is keyed to the shaft 8 and is provided with an overhanging portion 10. This overhanging portion carries the mixing arms 11 which are connected to a framework 12 provided with outer side straps 13 and with bottom flaps or paddle-like members 14. The head 9 is recessed and carries roller bearings 15 which constitute thrust bearings. They are supported by a stationary pipe or sleeve 16 which is also provided with a bearing 17 adjacent its upper end. The roller bearings rest upon the sleeve, as indicated, and thus support the head 9, such head being rigidly keyed or otherwise fastened to the shaft 8. The support is, therefore, secured by the roller bearings for the entire apparatus including the shaft and mixing frame. The shaft extends downwardly through a bearing 18 carried by a fitting 19 secured to the base 1. This fitting is internally threaded and receives the pipe 16 previously described. Thus, the upper and lower bearings are protected from entrance of grit or other material.

In addition to the protection afforded by the construction previously described, dust collars 20 and 21 are also provided to close the joints between the supporting head 6 and the revoluble head 9, on the one hand, and between the head 9 and the pipe or stationary sleeve 16 on the other hand.

The dust collar 20 is secured by means of pins to the head 9 and is covered by means of a dust collar cap 22 carried by the stationary bearing head or supporting head 6. The dust collar 21 is secured to the stationary sleeve or pipe 16 and is positioned within the dust cap 23 carried by the head 9.

The upper end of the shaft is provided with a central aperture 24 through which grease or oil may be passed, grease or other lubricant being supplied through the aperture 25 formed in the stationary head 6. The central aperture 24 is provided with a branch aperture 26 for furnishing lubricant adjacent the bearing 7. It is provided with a transverse branch aperture 27 for furnishing lubricant to the ball bearings or thrust bearings 15. Further, it is provided with a branch aperture 28 for furnishing lubricant adjacent the bearing 17. If desired, the apertures 26 and 28 may open into slots formed in the shaft, as shown, in order to secure proper spreading of the lubricant.

The fitting 19 and the bearing 18 are provided with aligning apertures 29 adapted to receive lubricant and to pass it to the shaft. Preferably, the shaft is provided with a groove 30 in order to spread the lubricant completely over the face of the bearing.

It will be seen that a very simple type of mortar and plaster mixer has been provided by this invention in which all of the bearings are freely and easily lubricated, and in which provision is made for preventing the entrance of any dust or grit whatsoever to the bearings.

Further, all of the bearings are completely housed so that no particular skill or care is required by the operator as he may be free to dump the mixture or materials into the stationary mixing drum without any thought on his part in reference to guarding the bearings.

It will be seen further that a mixer has been provided which is of very simple construction and which may be readily produced.

Although the invention has been described in considerable detail, such description is intended as illustrative rather than limiting as the invention may be variously embodied and as the scope of such invention is to be determined as claimed.

I claim:

1. In a device of the class described, a rotatable shaft, an upper bearing member therefor, a support for said bearing member, a lower bearing member spaced from the upper bearing member, a revoluble head carried adjacent the upper end of said shaft, a sleeve arranged about shaft, between the lower bearing member and the head, and a plurality of dust caps closing the space between the revoluble head and support and between the head and sleeve.

2. In a device of the class described, a bearing head, a second bearing spaced from the head, a shaft projecting through the second bearing and received in the bearing head, a sleeve extending upwardly from the second bearing and held stationary, a revoluble head secured to the shaft adjacent its upper end and below the bearing head, dust collars positioned between said revoluble head and bearing head and between the revoluble head and sleeve, and a thrust bearing interposed between said revoluble head and the upper end of said sleeve.

3. In a device of the class described, a bearing fitting, a bearing carried by said fitting, a stationary sleeve rigidly carried by said fitting and projecting upwardly, a bearing head provided with a bearing, a shaft passing through the first bearing and received in the bearing head, a revoluble head rigidly carried by said shaft and positioned between the upper end of said sleeve and the bearing head, a thrust bearing positioned between the upper end of said sleeve and said revoluble head, said bearing head provided with a central aperture having a plurality of lateral ducts for conducting the lubricant, the fitting being provided with oiling means, and dust collars and dust caps positioned between the bearing head and the revoluble head and between the revoluble head and the stationary sleeve.

In testimony that I claim the foregoing I have hereunto set my hand at Milwaukee, in the county of Milwaukee and State of Wisconsin.

JOHN ALEXANDER.